(12) United States Patent
Kano et al.

(10) Patent No.: US 7,554,235 B2
(45) Date of Patent: Jun. 30, 2009

(54) MOTOR COVER AND ELECTRIC MOTOR EQUIPPED WITH THE SAME

(75) Inventors: Masami Kano, Kiryu (JP); Makoto Ogiwara, Kiryu (JP); Makoto Suzuki, Kiryu (JP); Toshiyuki Hattori, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 487 days.

(21) Appl. No.: 10/583,226

(22) PCT Filed: Dec. 14, 2004

(86) PCT No.: PCT/JP2004/018612

§ 371 (c)(1),
(2), (4) Date: Jun. 16, 2006

(87) PCT Pub. No.: WO2005/060075

PCT Pub. Date: Jun. 30, 2005

(65) Prior Publication Data

US 2007/0164621 A1 Jul. 19, 2007

(30) Foreign Application Priority Data

Dec. 16, 2003 (JP) ............................. 2003-418154

(51) Int. Cl.
*H02K 5/00* (2006.01)
(52) U.S. Cl. .......................................... 310/89; 310/71

(58) Field of Classification Search .................. 310/89, 310/68 R, 71, 64, 43, 83; 74/606 A
See application file for complete search history.

(56) References Cited

U.S. PATENT DOCUMENTS

| 6,617,719 B2 * | 9/2003 | Sunaga et al. ................. 310/64 |
| 6,707,185 B2 * | 3/2004 | Akutsu et al. ................. 310/71 |
| 2002/0053843 A1 | 5/2002 | Sunaga et al. ............. 310/68 R |
| 2003/0127921 A1 | 7/2003 | Akutsu et al. ............. 310/68 R |

FOREIGN PATENT DOCUMENTS

| JP | 2000-061947 | 2/2000 |
| JP | 2001-275328 | 10/2001 |
| JP | 2003-204654 | 7/2003 |

* cited by examiner

*Primary Examiner*—Javaid Nasri
(74) *Attorney, Agent, or Firm*—McCormick, Paulding & Huber LLP (57) ABSTRACT

A heat sink (35) is fixed by insert molding to a resin-made motor cover covering a case body fixed to a motor body. A flow-in portion (61) extending along a straight line and branch portions (62) to (66) formed so as to be branched to the flow-in portion (61) are formed in the heat sink (35), a tip portion of a power-feeding terminal (58) is disposed at the branch portion (62), and the tip portion of the power-feeding terminal (58) is disposed at the branch portion (63). In addition, when a molding resin is cast in the flow-in portion (61) and the branch portions (62) to (66) during the insert molding, these power-feeding terminals (58) and (59) are fixed to the branch portions (62) and (63) and terminal parts (58*b*) and (59*b*) are positioned by the branch portions (62) and (63).

12 Claims, 9 Drawing Sheets

MOTOR COVER AND ELECTRIC MOTOR EQUIPPED WITH THE SAME

CROSS-REFERENCE TO RELATED APPLICATIONS

This application is entitled to the benefit of and incorporates by reference essential subject matter disclosed in International Patent Application No. PCT/JP2004/018612 filed on Dec. 14, 2004 and Japanese Patent Application No. 2003-418154 filed on Dec. 16, 2003.

TECHNICAL FIELD

The present invention relates to: a motor cover, which is equipped with a resin-made cover body to which first and second metal parts are fixed by insert molding, the motor cover covering a case body provided to an electric motor; and an electric motor that is equipped with the motor cover.

BACKGROUND ART

As a driving source of a wiper apparatus, a power window apparatus, a sunroof apparatus or the like provided in a vehicle, an electric motor actuated by a power source such as a battery mounted on the vehicle is normally employed. In order to adapt the electric motor to these apparatuses, it is necessary to decelerate rotation of the motor to predetermined revolution speed. Therefore, a deceleration mechanism is attached to the electric motor to be used for these applications, whereby the electric motor is unitized as one electric motor with a deceleration mechanism.

Such an electric motor normally has a case body formed into a bathtub shape so as to contain a deceleration mechanism, and an opening portion of the case body is covered with a motor cover. Further, there is known a motor in which a control board for controlling an operation of a motor main body and the like are contained inside the case body. In this case, a heat sink made of aluminum for emitting, to the outside, heat of an electronic part such as an FET mounted on the control board is fixed to the motor cover.

The motor cover is normally made of a resin, and the heat sink is fixed by insert molding to a resin portion of the motor cover, namely, the cover body. Further, in order to connect the control board and the motor main body, or connect the control board and a power source terminal, power-feeding terminals formed of copper plates or the like are fixed to the motor cover, and these terminals are also fixed to the motor cover by insert molding as shown in, for example, Patent Document 1. Namely, the heat sink and the respective terminals are arranged inside a mold die for molding the cover body, and then a melt resin material is cast in the mold die, whereby the heat sink and the terminals are fixed integrally to the resin-made cover body.

Meanwhile, in the case where the control board is arranged in the cover so as to oppose the heat sink, it is necessary to arrange, on the heat sink, a terminal part located on a control board side of the terminal connected to the control board. For this reason, a groove-shaped flow-in portion in which the resin material is cast at a time of the insert molding is provided in the heat sink, and a terminal part located on one side of the terminal is insert-molded so as to be arranged at this flow-in portion. Thereby, the terminal part on the control board side of the terminal is fixed to the flow-in portion by the resin material cast in the flow-in portion, namely, is positioned on the heat sink.

Patent Document 1: Japanese Patent Laid-Open Publication No. 2000-61947

DISCLOSURE OF THE INVENTION

However, as the resin material ejected during the insert molding is cooled and hardened, the volume of the ejected resin material contracts gradually. Therefore, positions of the heat sink and the terminals inserted therein are pulled by the contraction of the resin material and displaced from their regular positions in some cases. Especially, when the width of the flow-in portion formed in the heat sink is large, the resin material cast in the flow-in portion contracts significantly in a flow-in direction, so that the terminal part of the terminal arranged in the flow-in portion is pulled in a contraction direction and a position of the terminal part is significantly displaced. For this reason, since it becomes difficult to connect the terminal part of the terminal and the control board, assembly workability of this motor cover deteriorates.

An object of the present invention is to prevent two metal parts fixed to a resin-made cover body by insert molding from being displaced from their positions and to improve assembly workability of the motor cover.

A motor cover according to the present invention is one having a resin-made cover main body to be fixed by insert molding in a state where first and second metal parts are spaced from each other, the motor cover covering a case body to be provided to an electric motor, and comprises: a flow-in portion in which a resin material is cast when the cover main body is insert-molded; and a branch portion which is formed so as to be branched to the flow-in portion and in which the resin material is cast via the flow-in portion, the flow-in portion and the branch portion being provided in the first metal part, wherein a portion of the second metal part is disposed in the branch portion.

The motor cover according to the present invention is such that a cross-sectional area perpendicular to a longitudinal-directional axis line of the branch portion is formed smaller than a cross-sectional area perpendicular to a longitudinal-directional axis line of the flow-in portion.

The motor cover according to the present invention is such that the first metal part is a heat sink, which is arranged so as to oppose a control circuit for controlling the electric motor and emits heat inside the case body to outside, and the second metal part is a power-feeding terminal electrically connecting the control circuit and the electric motor.

The motor cover according to the present invention is such that the flow-in portion and the branch portion are formed into a groove shape in the heat sink.

The motor cover according to the present invention is such that the first metal part is exposed from only one surface of a front surface and a rear surface of the cover main body.

The motor cover according to the present invention is such that a heat radiating resin portion contacting with the first metal part and a base portion supporting the heat radiating resin portion are provided in the cover main body, the heat radiating resin portion is formed of a thermal conductive resin material, and the base portion is formed of a resin material different from the thermal conductive resin material.

The motor cover according to the present invention is such that the first metal part is formed of an aluminum material.

The motor cover according to the present invention is such that the case body is formed of a conductor; a power-feeding unit controlling power feeding to the electric motor and electrically connected to the first metal part is contained in the case body; and, by a fixing member formed of a conductor, the cover main body is fixed to the case body and the first metal part is electrically connected to the case body.

The motor cover according to the present invention is such that the power-feeding unit comprises a brush apparatus performing the power feeding to the electric motor.

The motor cover according to the present invention is such that the power-feeding unit comprises a control circuit controlling the electric motor.

The motor cover according to the present invention is such that the fixing member includes: a clip portion engaged with the case body and the cover main body and fixing the cover main body to the case body; and a contact portion formed so as to protrude from the clip portion and contacting with the first metal part.

The motor cover according to the present invention is such that the contact portion is fixed by being press-fitted to a press-fitting portion provided in the first metal part.

An electric motor according to the present invention is one equipped with a case body and a motor cover covering the case body, and comprises: a resin-made cover main body to be fixed by insert molding in a state where first and second metal parts are spaced from each other, the cover main body being provided in the motor cover; and a flow-in portion in which a resin material is cast when the cover main body is insert-molded, and a branch portion, which is formed to be branched to the flow-in portion and in which the resin material is cast via the flow-in portion, the flow-in portion and the branch portion being provided in the first metal part, wherein a portion of the second metal part is disposed in the branch portion.

The electric motor according to the present invention is such that a cross-sectional area perpendicular to a longitudinal-directional axis line of the branch portion is formed smaller than a cross-sectional area perpendicular to a longitudinal-directional axis line of the flow-in portion.

The electric motor according to the present invention is such that the first metal part is a heat sink, which is arranged so as to oppose a control circuit controlling the motor main body and emits heat inside the case body to outside, and the second metal part is a power-feeding terminal electrically connecting the control circuit and the motor main body.

The electric motor according to the present invention is such that the flow-in portion and the branch portion are formed in a groove shape in the heat sink.

The electric motor according to the present invention is such that the first metal part is exposed from only one surface of a front surface and a rear surface of the cover main body.

The electric motor according to the present invention is such that a heat radiating resin portion contacting with the first metal part and a base portion supporting the heat radiating resin portion are provided in the cover main body; the heat radiating resin portion is formed of a thermal conductive resin material; and the base portion is formed of a resin material different from the thermal conductive resin material.

The electric motor according to the present invention is such that the first metal part is formed of an aluminum material.

The electric motor according to the present invention is such that the case body is formed of a conductor; and a power-feeding unit that controls power feeding to the electric motor and is electrically connected to the first metal part is contained in the case body; and body by a fixing member formed of a conductor, the cover main body is fixed to the case body and the first metal part is electrically connected to the case body.

The electric motor according to the present invention is such that the power-feeding unit comprises a brush apparatus performing the power feeding to the electric motor.

The electric motor according to the present invention is such that the power-feeding unit comprises a control circuit controlling the electric motor.

The electric motor according to the present invention is such that the fixing member includes: a clip portion engaged with the case body and the cover main body and fixing the cover main body to the case body; and a contact portion formed so as to protrude from the clip portion and contacting with the first metal part.

The electric motor according to the present invention is such that the contact portion is fixed by being press-fitted to a press-fitting portion provided in the first metal part.

According to the present invention, the branch portion formed so as to be branched from the flow-in portion is provided in the first metal part, and a portion of the second metal part is disposed in the branch portion in a state of being separated from the first metal part. Therefore, even if the resin material cast in the flow-in portion contracts, the portion of the second metal part is fixed to the branch portion by the resin material cast in the branch portion and is prevented from being displaced from its position. Especially, when the branch portion is formed smaller than the flow-in portion, the resin material cast in the branch portion is hardened faster than the resin material in the flow-in portion, so that the second metal part can be further prevented from being displaced from the position thereof. Therefore, a subsequent process for correcting the position of the second metal part and the like becomes unnecessary, and it is possible to improve assembly workability of this motor cover.

Further, according to the present invention, since displacement of the second metal part is restrained, it is possible to prevent the second metal part from coming in contact with the first metal part. Especially, in the case where the first metal part is a heat sink and the second metal part is a power-feeding terminal for the electric motor, since the resin is interposed between the heat sink and the terminal, it is possible to prevent short circuiting from being caused owing to contact between the heat sink and the terminal.

Furthermore, according to the present invention, since the first metal part provided in the motor cover is exposed from only one surface of the front surface and the rear surface of the cover main body, it is possible to form a resin layer expanding over one entire surface of the cover main body. Thereby, it is possible to prevent water from leaking from a portion between the first metal part and the cover main body and to increase dramatically a water-proof property of the motor cover. Moreover, it is possible to omit a conventional process having been provided for ensuring the water-proof property of the motor cover and to reduce costs of this motor cover and the electric motor. Further, the heat radiating resin portion of the cover main body is formed of a thermal conductive resin material while the base portion supporting the heat radiating resin portion is formed of a resin material different from the thermal conductive resin material. For this reason, when the first metal part is the heat sink, it is possible to efficiently emit heat of a control circuit and the like contained in the case body to the outside.

Moreover, according to the present invention, the power-feeding unit to the electric motor is connected electrically to the case body via the fixing member for fixing the motor cover to the case body, so that it is possible to improve noise shielding effects of the first metal part and the case body. Thereby, it is possible to prevent malfunction of the power-feeding unit caused owing to noises and to improve operation reliability of this electric motor. Furthermore, since the first metal part and the case body is electrically connected by the fixing member for fixing the motor cover to the case body, it becomes unnecessary to provide a connection structure separately. Therefore, it is possible to reduce the number of parts and the number of assembly processes and to reduce the costs of this motor cover and the electric motor. Moreover, since a contact portion of the fixing member is fixed to a press-fitting portion of the first metal part by press fitting, it is possible to connect certainly the contact portion to the first metal part.

BEST MODE FOR CARRYING OUT THE INVENTION

Embodiments of the present invention will be detailed with reference to the accompanying drawings hereinafter.

Figure 1:
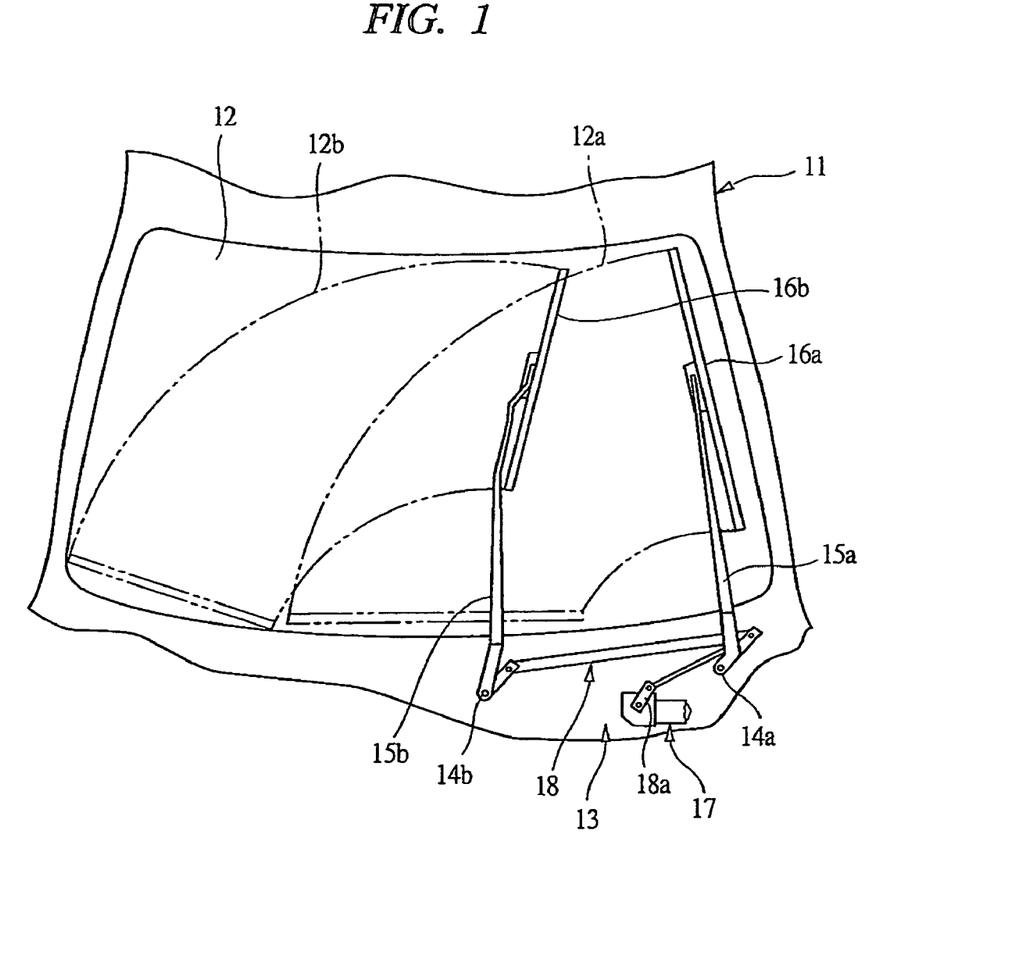
FIG. 1 is an explanatory view showing the case where an electric motor with a deceleration mechanism, which is provided with a motor cover according to one embodiment of the present invention, is applied to a wiper apparatus.

As shown in FIG. 1, a vehicle 11 is provided with a wiper apparatus 13 in order to wipe away rain and droplets from forerunning vehicle, which adhere to a front glass 12, and to ensure a driver's visual range. This wiper apparatus 13 has two wiper shafts 14a and 14b supported rotatably by the vehicle 11, wherein a wiper arm 15a on a driver's seat side, namely, a DR side is fixed to the wiper shaft 14a and a wiper arm 15b on a assistant's seat side, namely, an AS side is fixed to the wiper shaft 14b. Further, a wiper blade 16a on the driver's seat side, namely, the DR side is mounted on an tip portion of the DR-side wiper arm 15a, and a wiper blade 16b on the assistant's seat side is mounted on a tip portion of the AS-side wiper arm 15b, wherein the respective wiper blades 16a and 16b contact with the front glass 12 due to pressing forces applied by unshown springs incorporated in the wiper arms 15a and 15b.

In order to drive the respective wiper shafts 14a and 14b, this wiper apparatus 13 is provided with an electric motor 17 with a deceleration mechanism, which serves as an electric motor also called a wiper motor. This electric motor 17 with a deceleration mechanism is connected via a link mechanism 18 to the respective wiper shafts 14a and 14b, and a clank arm 18a of the link mechanism 18 is rotated and driven, whereby the respective wiper shafts 14a and 14b are oscillated within a specified angle range. And, when the respective wiper shafts 14a and 14b oscillate, the wiper blades 16a and 16b oscillate within wiping ranges 12a and 12b between an upper reverse position and a lower reverse position on the front glass 12, whereby the front glass 12 is wiped.

Figure 2:
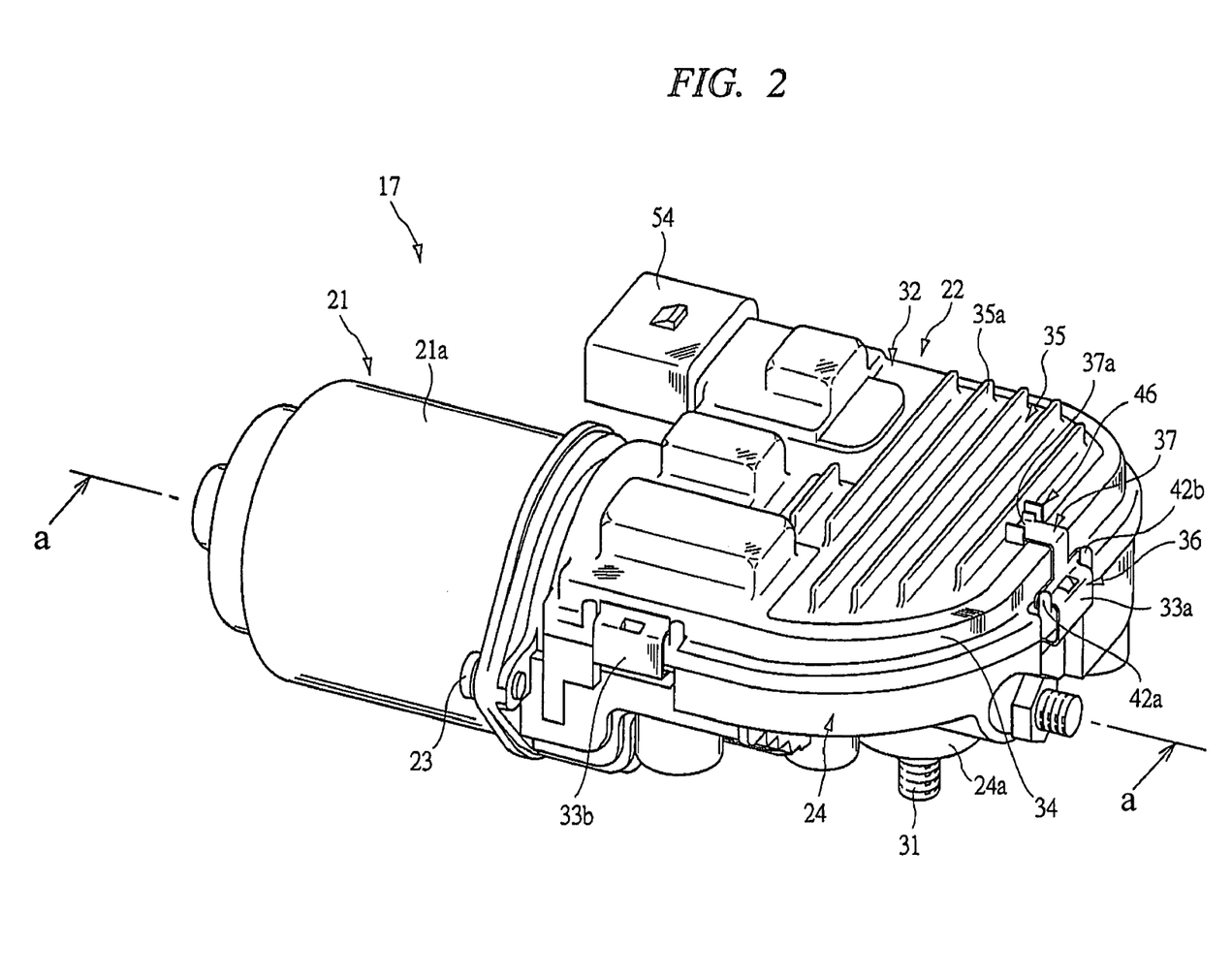
FIG. 2 is a perspective view showing details of the electric motor with a deceleration mechanism shown in FIG. 1.
Figure 3:
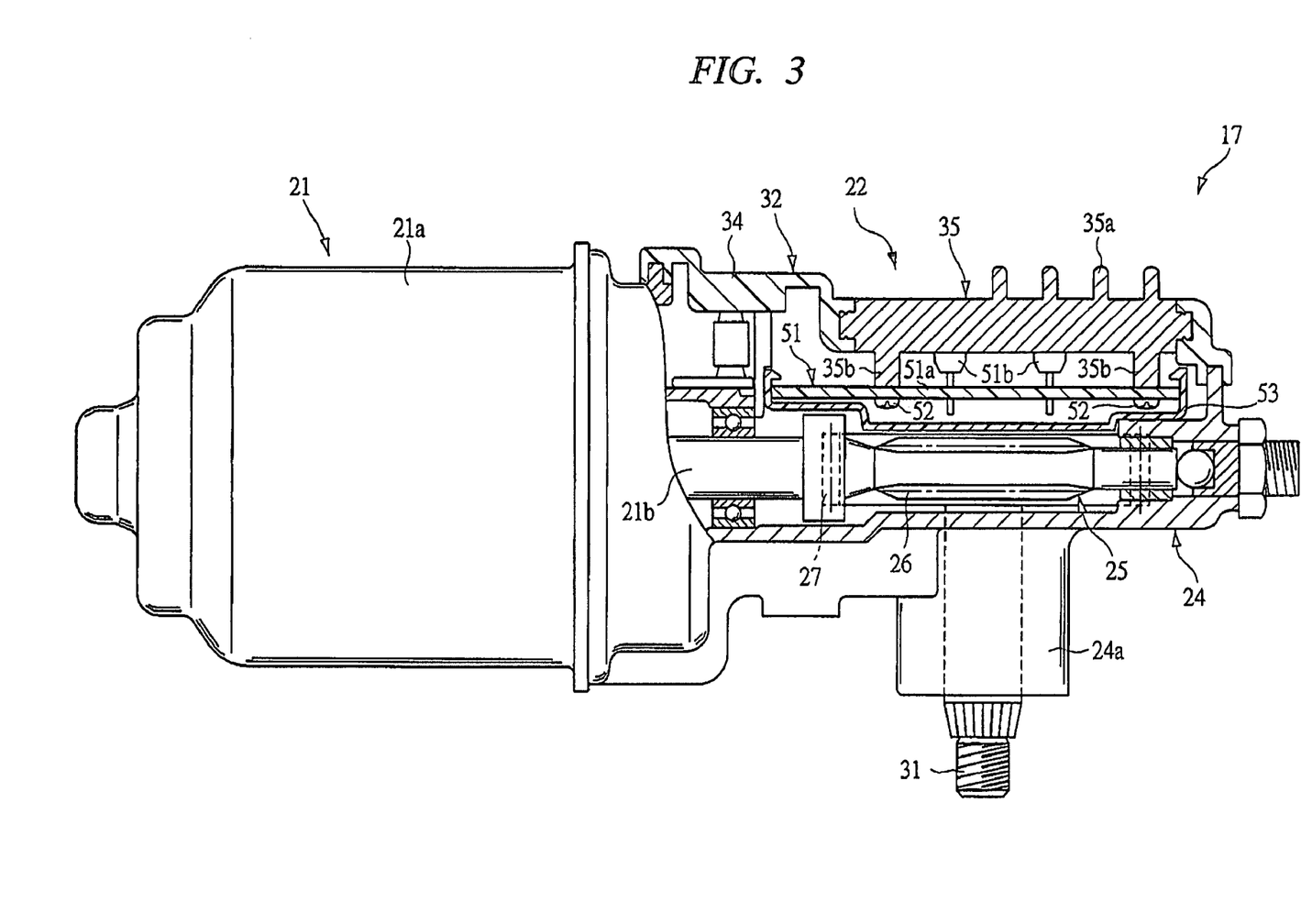
FIG. 3 is a cross-sectional view taken along line a-a in FIG. 2.

FIG. 2 is a perspective view showing details of the electric motor with a deceleration mechanism shown in FIG. 1, and FIG. 3 is a cross-sectional view taken along line a-a in FIG. 2.

As shown in FIG. 2, the electric motor 17 with a deceleration mechanism has a motor main body 21 and a decelerator 22. In this case, a so-called electric motor with a brush is used as the motor main body 21. As shown in FIG. 3, the motor main body 21 has: a yoke 21a made of a conductor such as a steel material and formed into a bottomed cylindrical shape; and a rotating shaft 21b protruding from the yoke 21a, thereby being operated by a direct current from an unshown battery (power source) mounted in the vehicle 11 to rotate the rotating shaft 21b.

Note that although the motor main body 21 is an electric motor with a brush when being illustrated, it is not limited to such an electric motor with a brush and may be an electric motor of another type such as a brushless DC motor.

On the other hand, the decelerator 22 has a case body 24 that is fixed to the yoke 21a by a fastening member 23. This case body 24 is formed into a bathtub shape by casting an aluminum material (aluminum alloy) that is a conductor, and, as shown in FIG. 3, the case body contains a deceleration mechanism 25 therein.

The deceleration mechanism 25 is a worm gear mechanism having a worm 26 and a worm wheel 27 engaged with the worm 26, and the worm 26 is formed integrally with an outer circumference of the rotating shaft 21b protruding inside the case body 24, thereby rotating together with the rotating shaft 21b. On the other hand, the worm wheel 27 is fixed to a base end portion of an output shaft 31 supported rotatably by a boss portion 24a formed in the case body 24, and can rotate together with the output shaft 31 in the case body 24. Thereby, when the rotating shaft 21b rotates, the rotation is decelerated to specified revolution speed due to the deceleration mechanism 25 and is outputted from the output shaft 31.

A tip portion of the output shaft 31 protrudes outward from the case body 24, and the above-mentioned clank arm 18a is fixed to the tip portion thereof. Therefore, when the motor main body 21 is operated, its rotation is transmitted via the deceleration mechanism 25 and the output shaft 31 to the clank arm 18a, whereby the wiper shafts 14a and 14b oscillate.

As shown in FIG. 2, a motor cover 32 is fixed to the case body 24 by clips 33a and 33b, and an opening portion of the case body 24 is covered by this motor cover 32. The motor cover 32 has a cover body 34, which is made of a resin material that is a nonconductor and formed into a lid shape, and a resin portion of the cover body 34 contacts with an outer circumference of the opening portion of the case body 24. Further, a heat sink 35 as a first metal part having a plurality of fins 35a is fixed to the cover body 34 by insert molding. The heat sink 35 is formed of an aluminum material, and outer surfaces of the heat sink are exposed from a rear side and a front side of the motor cover 32.

Figure 4:
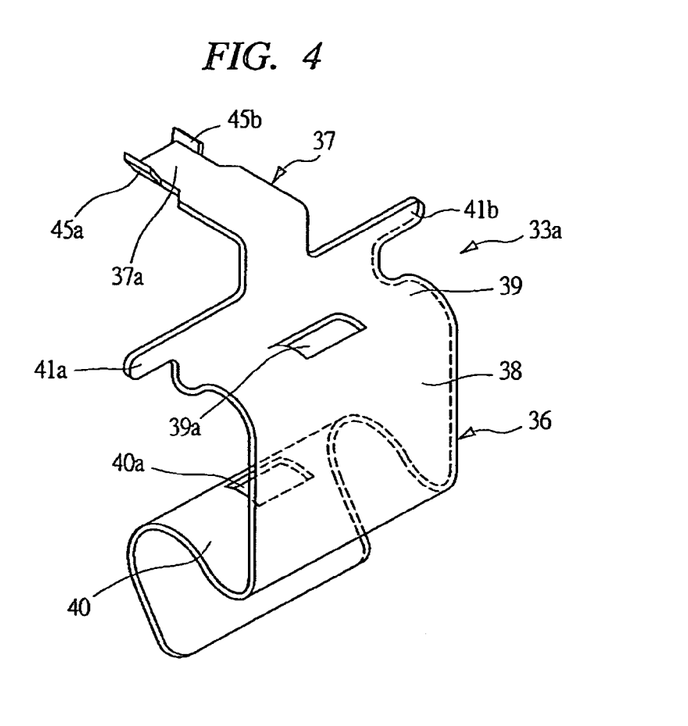
FIG. 4 is a perspective view showing details of a clip shown in FIG. 2.
Figure 5:
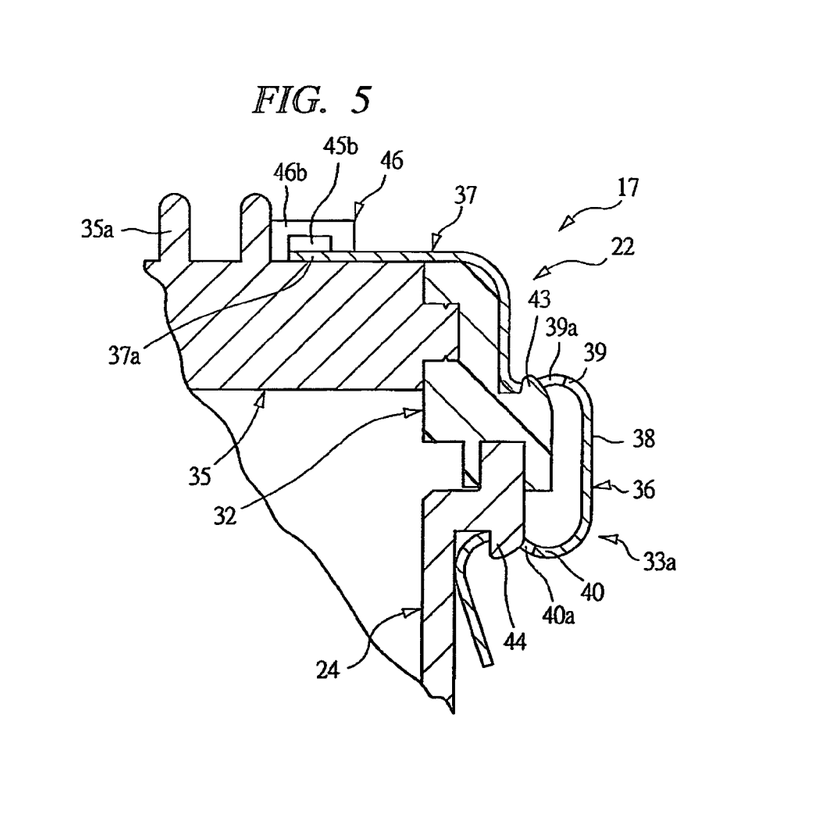
FIG. 5 is a cross-sectional view showing a state of fixing the motor cover to a case body by the clip shown in FIG. 4.

FIG. 4 is a perspective view showing details of a clip shown in FIG. 2, and FIG. 5 is a cross-sectional view showing a state of fixing the motor cover to the case body by the clip shown in FIG. 4.

As mentioned previously, the motor cover 32 is fixed to the case body 24 by the clips 33a and 33b, and the clip 33a on one side has a function of fixing the motor cover 32 to the case body 24 and of electrically connecting the heat sink 35 to the case body 24. Details of the clip 33a will be explained hereinafter.

As shown in FIG. 4, the clip 33a as a fixing member is formed of a steel plate as a conductor, and has: a clip portion 36 having a function of fixing the motor cover 32 to the case body 24; and a contact portion 37 that protrudes from the clip portion 36 to contact with the heat sink 35.

The clip portion 36 has a base 38 formed into a flat plate and a pair of elastic deformed portions 39 and 40 formed into S-shaped cross sections, and engaging holes 39a and 40a are provided in the elastic deformed portions 39 and 40, respectively. Further, a pair of engaging claws 41a and 41b expanding in a width direction are provided on one side, namely, in the elastic deformed portion 39 to be on a side of the motor cover 32.

When this clip portion 36 is to be engaged with the motor cover 32, as shown in FIG. 2, the engaging claws 41a and 41b are first hooked around hooked portions 42a and 42b provided to the motor cover 32. At this time, as shown in FIG. 5, the engaging hole 39a of the elastic deformed portion 39 is engaged with a cover-side engaging protrusion 43 provided to the motor cover 32. Then, the elastic deformed portion 40 is pushed to a case-side engaging protrusion 44 provided to the case body 24, and both of the elastic deformed portions 39 and 40 are elastically deformed in a direction of being separated from each other, and the engaging hole 40a of the elastic deformed portion 40 is engaged with the case-side engaging protrusion 44 during above elastic deformation. Thereby, the engaging holes 39a and 40a of the clip portion 36 are respectively engaged with the engaging protrusions 43 and 44 in a state where the respective elastic deformed portions 39 and 40 are elastically deformed in a direction of being separated from each other. Accordingly, by respective elastic forces of the elastic deformed portions 39 and 40, the engaging protrusions 43 and 44 are biased in a direction of coming close to each other, whereby the case body 24 and the motor cover 32 are fixed to each other by the clip portion 36. At this case, the clip portion 36 contacts with the case body 24 at the elastic deformed portion 40, so that the clip 33a is electrically connected to the case body 24.

On the other hand, the contact portion 37 is formed so as to protrude from one side, namely, from the elastic deformed portion 39 located on a side of the motor cover 32 to a side of the motor cover 32, and is bent along the motor cover 32 so as to reach an outer surface of the heat sink 35, wherein the tip portion 37a of the contact portion contacts with the heat sink 35. A pair of inclined portions 45a and 45b are provided to the tip portion 37a of the contact portion 37, and these inclined portions 45a and 45b are press-fitted in a press-fitting portion 46 provided in the heat sink 35 and are fixed thereto.

Figure 6A:
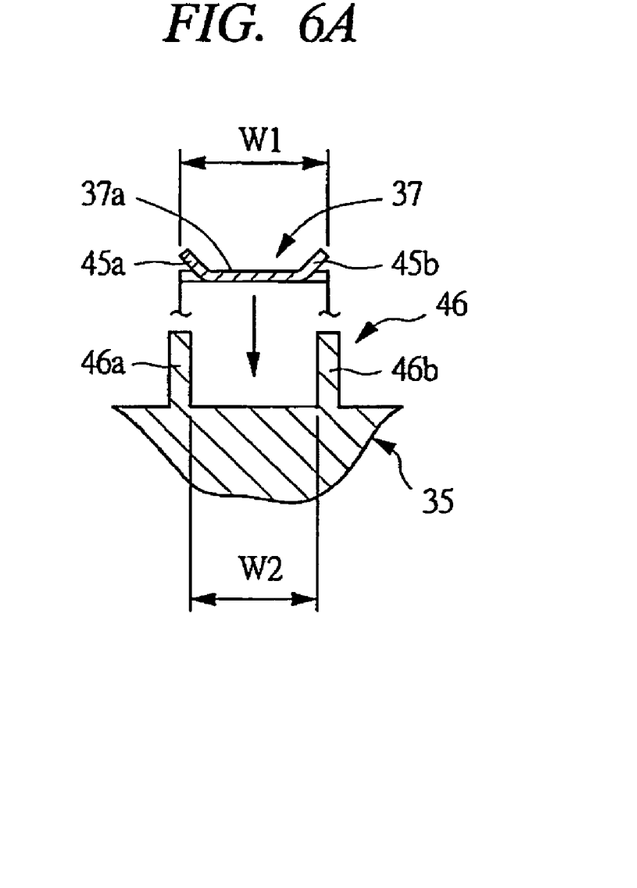
FIGS. 6A and 6B are each a cross-sectional view showing a process for fixing inclined portions shown in FIG. 4 to a press-fitting portion.
Figure 6B:
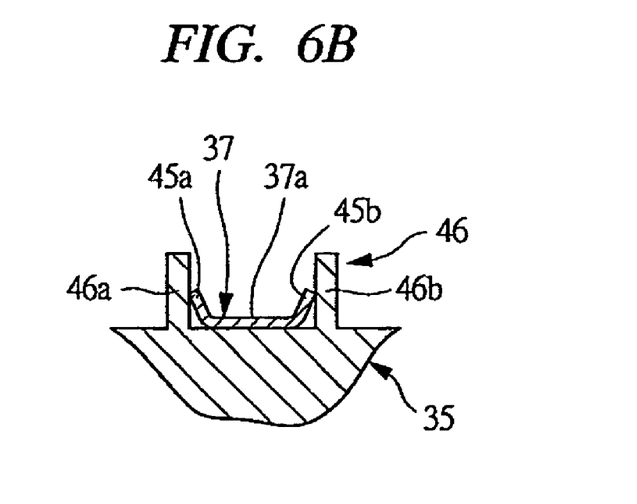

FIG. 6A and FIG. 6B are each a cross-sectional view showing a process for fixing the inclined portions shown in FIG. 4 to the press-fitting portion. In this case, the press-fitting portion 46 comprises a pair of wall portions 46a and 46b, which are provided integrally on the heat sink 35 and spaced a predetermined interval from each other and oppose each other. In contrast, the inclined portions 45a and 45b provided to the contact portion 37 are inclined in a direction where the interval between them becomes narrow gradually toward the heat sink 35 with respect to the outer surface of the heat sink 35, and, as shown in FIG. 6A, a maximum interval W1 between the inclined portions 45a and 45b before press fitting is set larger than an interval W2 between the wall portions 46a and 46b. As shown in FIG. 6B, the contact portion 37 is press-fitted into the press-fitting portion 46 from a direction perpendicular to the outer surface of the heat sink 35 and is fixed to the heat sink 35 so that these inclined portions 45a and 45b contact with the wall portions 46a and 46b, respectively. Further, when the respective inclined portions 45a and 45b are press-fitted into the press-fitting portion 46, they are elastically deformed in a direction where the interval between them becomes narrower, so that the inclined portions firmly contact with the wall portions 46a and 46b by elastic forces due to this elastic deformation. Accordingly, the tip portion 37a of the contact portion 37 is securely fixed to the press-fitting portion 46, thereby being not released easily from the press-fitting portion 46 owing to vibration or the like.

As shown in FIG. 3, a control board 51 is contained inside the case body 24 so as to oppose the heat sink 35, and operation control of the motor main body 21 is carried out by this control board 51. The control board 51 is a board having a function as a so-called microcomputer, which is equipped with a control circuit formed by a plurality of electronic parts 51b such as a CPU, a memory, and an FET on a board 51a, and supplies a DC from an unshown battery or the like mounted in the vehicle 11 in response to an instruction signal from an unshown wiper switch and controls the operation of the motor main body 21.

The control board 51 is fixed to the heat sink 35, and the electronic parts 51b such as FETs mounted on the control board 51 are attached to a rear surface of the heat sink 35. Thereby, the heat that these electronic parts 51b generate is emitted to the outside by the heat sink 35. Namely, the heat sink 35 emits the heat in the case body 24 to the outside.

Further, the heat sink 35 is provided integrally with a connecting portion 35b that protrudes toward the control board 51, and a portion of an unshown ground line of the control board 51 is provided around an unshown through hole opposing to the connection portion 35b, and the control board 51 is fixed to the connection portion 35b by a screw member 52 that is inserted into the through hole. Thereby, the connection portion 35b and the ground line, namely, the heat sink 35 and the control board 51 are electrically connected to each other.

Note that the reference numeral "53" is a separator that separates the deceleration mechanism 25 from the control board 51.

When the contact portion 37 of the clip 33 is fixed to the press-fitting portion 46 and the heat sink 35 is electrically connected to the contact portion 37, the heat sink 35 is electrically connected to the case body by the clip 33: When the heat sink 35 is electrically connected to the case body 24, impedance of the case body 24 and the heat sink 35 is decreased, whereby the noise shielding effects by the case body 24 and the heat sink 35 are increased. Namely, since the case body 24 and the heat sink 35 form a so-called shielding room, noises from the outside can be shut out with respect to the control board 51 contained in the case body 24 and surrounded by the case body 24 and the heat sink 35.

As explained above, in the electric motor 17 with a deceleration mechanism, the case body 24 and the heat sink 35 are electrically connected by the clip 33, so that the noise-shielding effects by the case body 24 and the heat sink 35 can be enhanced. Accordingly, it is possible to protect the control board 51 contained in the case body 24 from noises and to reduce the malfunction of the control board 51 to perform certainly the operation of the electric motor 17 with a deceleration mechanism.

Further, in the electric motor 17 with a deceleration mechanism, since the case body 24 and the heat sink 35 are electrically connected by the clip 33 that fixes the motor cover 32 to the case body 24, it is not required to separately provide a connection structure for connecting the case body 24 and the heat sink 35. Accordingly, since the number of parts and the number of assembly processes are reduced, the cost of this electric motor 17 with a deceleration mechanism can be reduced.

Furthermore, in the electric motor 17 with a deceleration mechanism, since the contact portion 37 provided to the clip 33 is press-fitted in and fixed to the press-fitting portion 46 provided to the heat sink 35, the contact portion 37 can be securely fixed to the heat sink 35. Moreover, since the pair of inclined portions 45a and 45b, the width between which is gradually narrowed in a press-fitting direction, are provided to the contact portion 37 and these inclined portions 45a and 45b are press-fitted into the press-fitting portion 46 in an elastically deformed state, it is possible to further securely connect the contact portion 37 to the heat sink 35. Accordingly, for example, even in the case where vibration or the like of the vehicle 11 is added, the contact portion 37 is prevented from being disconnected from the press-fitting portion 46 owing to this vibration, so that the operation of this electric motor 17 with a deceleration mechanism can be securely performed.

Figure 7:
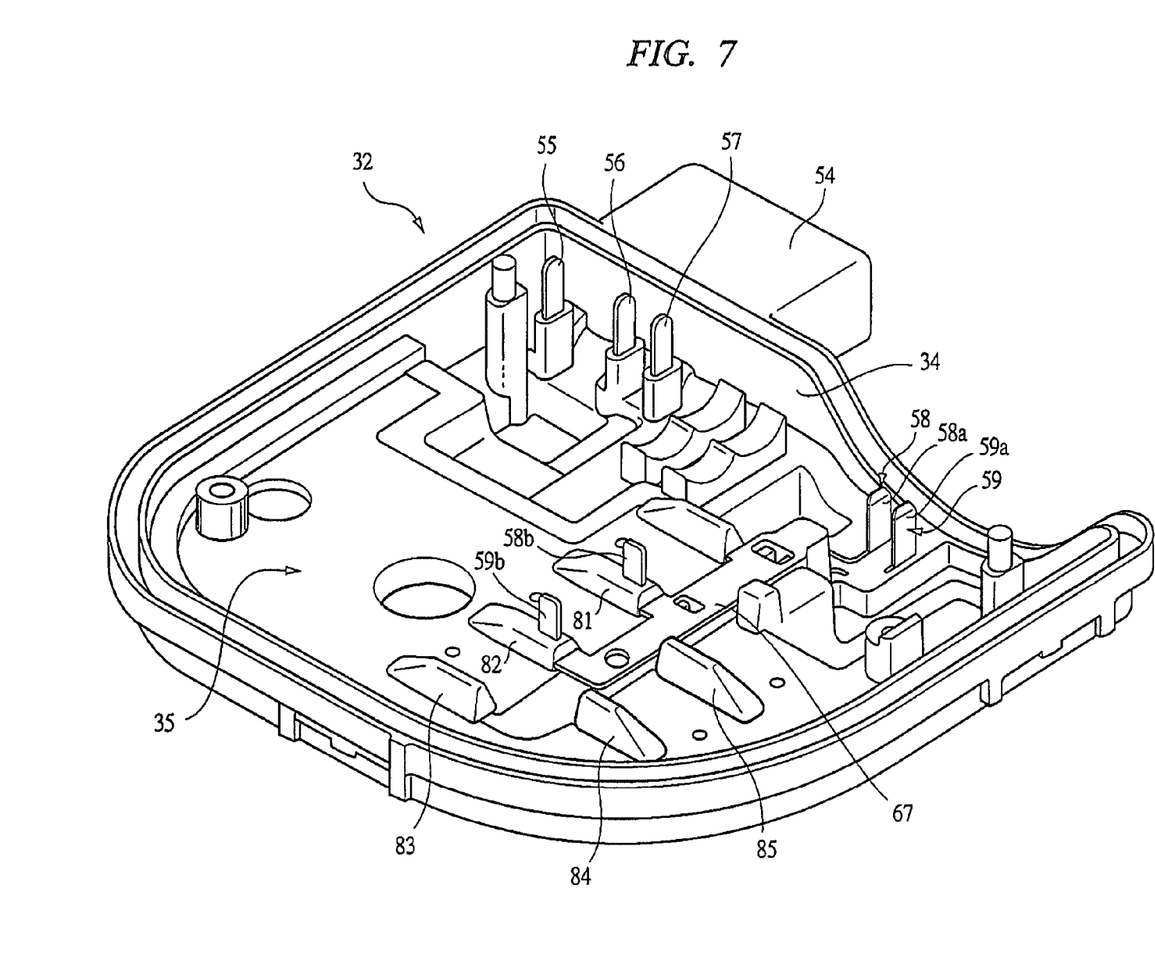
FIG. 7 is a perspective view showing details of the motor cover shown in FIG. 2.

FIG. 7 is a perspective view showing details of the motor cover shown in FIG. 2.

As shown in FIG. 7, three power source terminals 55 to 57 are fixed to the cover main body 34 by insert molding, the three power source terminals connecting the control board 51 and unshown connection terminals provided in a coupler 54 formed integrally with the cover main body 34. The control board 51 is connected via these power source terminals 55 to 57 and the connection terminals of the coupler 54 to a power source such as a battery mounted in the vehicle 11, a wiper switch, and the like not shown.

Further, two power-feeding terminals 58 and 59 as second metal parts are fixed to the cover main body 34 by insert molding. The power-feeding terminal 58 has: a terminal part 58a connected to an unshown power-feeding terminal of the motor main body 21; and a terminal part 58b connected to the control board 51, and the power-feeding terminal 59 has: a terminal part 59a connected to an unshown power-feeding terminal of the motor main body 21; and a terminal part 59b connected to the control board 51, wherein the control board 51 and the motor main body 21 are electrically connected to each other by these power-feeding terminals 58 and 59. Namely, these power-feeding terminals 58 and 59 are power-feeding terminals for feeding power from the control board 51 to the motor main body 21.

Figure 8:
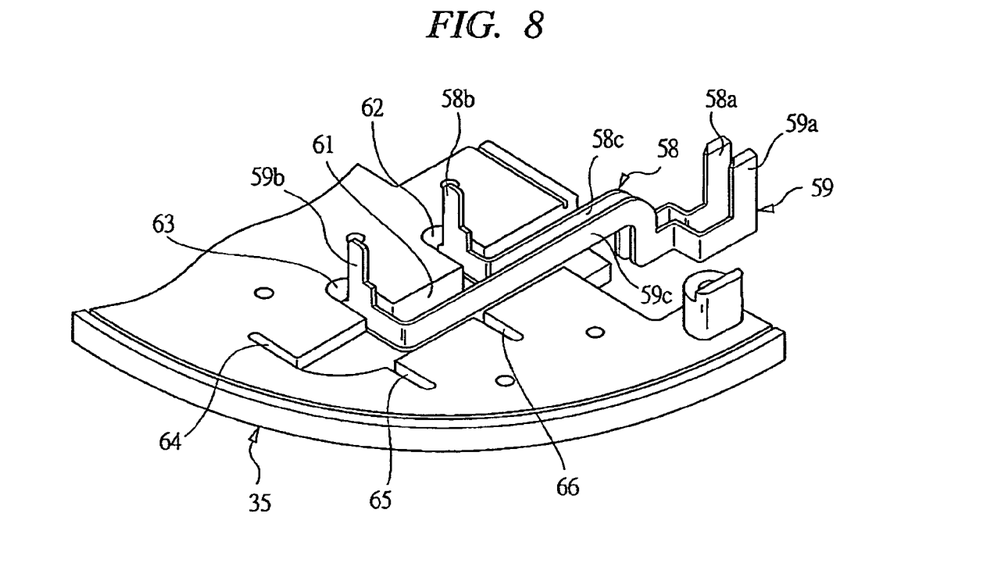
FIG. 8 is a perspective view showing details of a heat sink and a terminal before insert molding.
Figure 9:
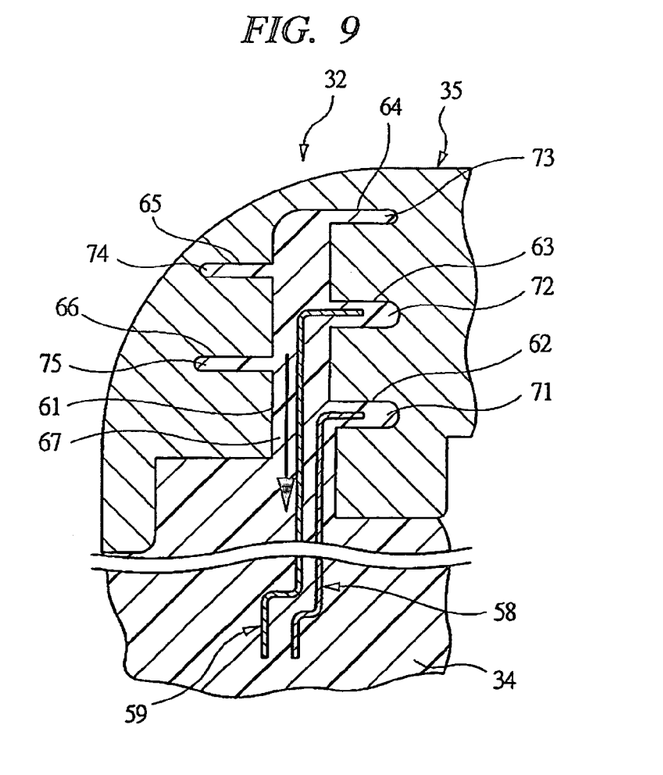
FIG. 9 is a cross-sectional view showing a state of a power-feeding terminal after the insert molding.

FIG. 8 is a perspective view showing details of the heat sink and the terminal before insert molding, and FIG. 9 is a cross-sectional view showing a state of the power-feeding terminal after the insert molding.

As shown in FIG. 8, in the heat sink 35, there are provided a flow-in portion 61 formed in a straight line shape and five branch portions 62 to 66 formed so as to be bent from the flow-in portion 61 in a direction perpendicular to a flow direction, namely, so as to be branched from the flow-in portion 61. This flow-in portion 61 and the branch portions 62 to 66 are formed in groove shapes in the heat sink 35. When the cover main body 34 is insert-molded, namely, when a melt resin material is ejected into an unshown mold die for molding the cover main body 34, a portion of the resin material is cast in the flow-in portion 61 and the resin material is cast via the flow-in portion 61 in the branch portions 62 to 66. In this case, a cross sectional area perpendicular to a longitudinal-directional axis line of each of the branch portions 62 to 66, namely, to an axis line orthogonal to the flow direction of the flow-in portion 61 is formed smaller than a cross sectional area perpendicular to a longitudinal-directional axis line of the flow-in portion 61, namely, to an axis line directed to the flow-in direction, so that the branch portions 62 to 66 are formed smaller than the flow-in portion 61.

On the other hand, the power-feeding terminal 58 is formed by bending a copper plate into a specified shape, and a pair of terminal parts 58a and 58b are provided to both tip portions thereof. The tip portion to which the one-side terminal part 58a is provided is displaced on a side of the cover main body 34, and the tip portion to which the other-side terminal part 58b is provided is displaced in the branch portion 62. Further, a main body portion 58c between both the terminal parts 58a and 58b is arranged along the flow-in portion 61. In the same manner, the power-feeding terminal 59 is formed by bending a copper plate into a specified shape, and a pair of terminal parts 59a and 59b are provided to both tip portions thereof. The one-side terminal part 59a is arranged in parallel to the terminal part 58a on a side of the cover main body 34, and the tip portion to which the other-side terminal part 59b is provided is displaced at the branch portion 63. Further, the main body portion 59c between the terminal parts 59a and 59b is arranged along the flow-in portion 61. Note that these power-feeding terminals 58 and 59 are arranged in a state of being insulated from each other and having a specified clearance with respect to the flow-in portion 61 and the branch portions 62 and 63 so as not to contact the heat sink 35.

As shown in FIG. 9, when the insert molding of the resin material is carried out in a state where the power-feeding terminals 58 and 59 are arranged at the flow-in portion 61 and the branch portions 62 and 63, the resin material that is cast in the flow-in portion 61 is hardened and an embedded portion 67 of a straight line shape is formed in the cover main body 34. Further, since the resin material cast via the flow-in portion 61 in the branch portions 62 to 66 is hardened, five locking portions 71 to 75 are formed in the cover main body 34. The tip portions of the power-feeding terminals 58 and 59 arranged in the two branch portions 62 and 63 are embedded into the locking portions 71 and 72 formed in these branch portions 62 and 63 and are fixed in the branch portions 62 and 63, whereby, the terminal parts 58b and 59b of the power-feeding terminals 58 and 59 protruding from the locking portions 71 and 72 toward the control board 51 are positioned in the branch portions 62 and 63.

Further, as shown in FIG. 7, protrusion portions 81 to 85, which protrude to a side of the control board 51 with respect to the heat sink 35, are formed integrally with the locking portions 71 to 75, respectively, and the electronic parts 51b and the like to be mounted on the control board 51 are arranged among these protrusion portions 81 to 85. Namely, these protrusion portions 81 to 85 have functions of positioning the electronic parts 51b.

Herein, as shown in FIG. 9, in a process in which the resin material cast in the flow-in portion 61 is hardened and the embedded portion 67 is formed, the resin material cast in the flow-in portion 61 gradually contracts in the flow direction thereof, so that the power-feeding terminals 58 and 59 are pulled in a direction of an arrow shown in Figure. However, in this motor cover 32, the tip portions of the power-feeding terminals 58 and 59 are arranged in the branch portions 62 and 63 formed so as to be branched in the direction orthogonal to the flow-in portion 61. Therefore, even if the resin material in the flow-in portion 61 contracts in the flow direction, the locking portions 71 and 72 formed in the branch portions 62 and 63 are secured to the branch portions 62 and 63, whereby the tip portions are prevented from moving. Accordingly, displacement of the terminal parts 58b and 59b arranged at the tip portions of the power-feeding terminals 58 and 59 owing to the contraction of the resin material is prevented, and the terminal parts 58b and 59b are held at specified positions with respect to the control board 51.

In this manner, in this motor cover 32, the branch portions 62 and 63 formed so as to be branched to the flow-in portion 61 in which the resin material is cast are provided to the heat sink 35, and portions, namely, the tip portions of the power-feeding terminals 58 and 59 are arranged in the branch portions 62 and 63 in a state of being separated from the heat sink 35, whereby it is possible to prevent the displacement of the terminal parts 58b and 59b of the power-feeding terminals 58 and 59 owing to the contraction of the resin material in the flow-in portion 61. Accordingly, since the terminal parts 58b and 59b are fixed to the specified positions with respect to the control board 51, any subsequent process for correcting the positions and the like becomes unnecessary and it is possible to easily connect the power-feeding terminals 58 and 59 and the control board 51 and to improve the assembly workability of this motor cover 32. Further, since the terminal parts 58b and 59b do not contact with the heat sink 35 due to an occurrence of displacement, it is possible to prevent the power-feeding terminals 58 and 59 and the heat sink 35 from contacting with each other and causing short circuiting.

Further, in this motor cover 32, a cross-sectional area perpendicular to the longitudinal-directional axis line of each of the branch portions 62 to 66 is formed smaller than the cross-sectional area perpendicular to the longitudinal-directional axis line of the flow-in portion 61, so that the resin material cast in the branch portions 62 to 66 is hardened faster than the resin material in the flow-in portion 61. Namely, before the resin material in the flow-in portion 61 does not contract completely, the locking portions 71 and 72 are hardened and secured to the branch portions 62 and 63, whereby the displacement of the terminal parts 58b and 59b owing to the contraction of the resin material is further restrained.

Thus, in this motor cover 32, since each cross-sectional area of the branch portions 62 to 66 is formed smaller than the cross-sectional area of the flow-in portion 61, the locking portions 71 to 75 formed in the branch portions 62 to 66 are hardened faster than the resin material in the flow-in portion 61, so that the displacement of the terminal parts 58b and 59b of the power-feeding terminals 58 and 59 arranged in the branch portions 62 and 63 can be further restrained.

On the other hand, the respective locking portions 73 to 75 formed in the three branch portions 64 to 66 in which the power-feeding terminals 58 and 59 are not arranged are also hardened faster than the resin material in the flow-in portion 61, and are secured to the branch portions 64 to 66 and prevent the embedded portion 67 formed in the flow-in portion 61 from moving. Namely, in this motor cover 32, since the plurality of branch portions 62 to 66 are branched and formed on both sides to the flow-in portion 61 formed into a straight line shape, the resin material in these branch portions 62 to 66 is hardened and secured to the branch portions 62 to 66, whereby movement of the embedded portion 67 itself owing to the contraction of the resin material in the flow-in portion 61 is restrained. For this reason, the displacement of the terminal parts 58b and 59b to be embedded in the embedded portion 67 owing to the contraction is further restrained.

Figure 10A:
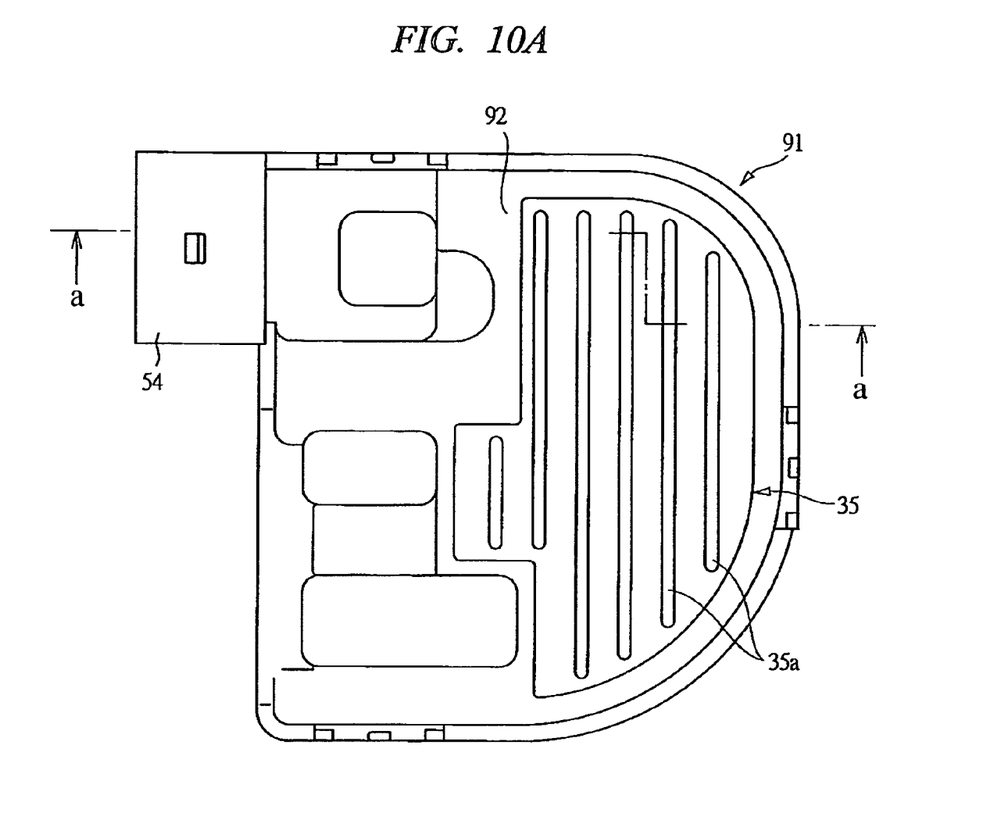
FIG. 10A is a top view showing a modified example of the motor cover shown in FIG. 2
Figure 10B:
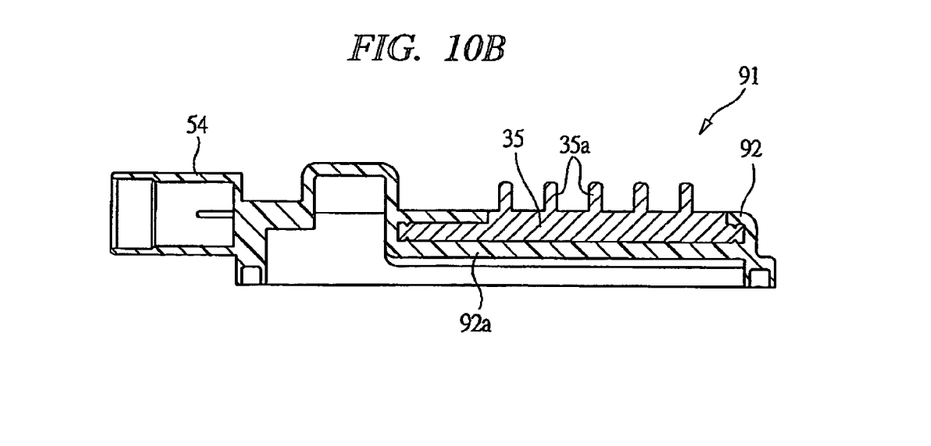
FIG. 10B is a cross-sectional view taken along line a-a in FIG. 10A.

FIG. 10A is a top view showing a modified example of the motor cover shown in FIG. 2, and FIG. 10B is a cross-sectional view taken along line a-a in FIG. 10A.

In the motor cover 32 shown in FIG. 2, the heat sink 35 is insert-molded into the resin-made cover main body 34 so as to expose on both sides of the front surface and the rear surface of the motor cover 32. However, the present invention is not limited to this and, like a motor cover 91 shown in FIG. 10A and FIG. 10B, the front surface of the heat sink 35 may be exposed to the outside and a heat-radiating resin portion 92a for covering the rear surface of the heat sink 35 (a surface opposing the control board 51) may be provided in the cover main body 92.

In this case, as a resin material for forming the cover main body 92, a thermal conductive resin material that is a thermoplastic molding material is used. As this thermal conductive resin material, for example, a material obtained by filling ceramics with a PPS (polyphenylene sulfide) resin or by filling carbon fibers with a PPS resin is employed. Note that as a base material of the thermal conductive resin material, the present invention is not limited to a PPS resin, and may use another engineering plastic such as a polyamide resin. Further, as a filling material, the present invention is not limited to ceramics or carbon fibers, and may use another filling material for increasing thermal conductivity.

In this manner, when the heat sink 35 is fixed to the motor cover 91 by insert molding, the heat sink 35 is exposed only on the front surface side of the motor cover 91, whereby it is possible to cover the entire rear surface of the heat sink 35 with the thermal conductive resin material. Accordingly, since an entire resin layer is formed seamlessly on the rear surface of the motor cover 91, it is possible to remarkably improve a water-proof property of the motor cover 91. Namely, the motor cover 91 has a structure in which the heat sink 35 does not pass through the resin layer, so that even if any joining failure occurs in an interface between the resin material and the metal material during the insert molding, a clearance occurring in the interface does not communicate with the case body 24 and it is possible to prevent rain drops or the like from getting into the case body 24. Further, a coating process of a sealing agent and a surface treatment process of the heat sink 35 become unnecessary in order to increase the water-proof property of the motor cover 91, whereby it is possible to reduce manufacturing costs of the motor cover 91, namely, the electric motor 17 with a deceleration mechanism. Furthermore, since the resin material of the heat radiating resin portion covering the rear surface of the heat sink 35 is a thermal conductive resin material, the heat generated from the control board 51 is efficiently transmitted via the resin layer to the heat sink 35.

Figure 11A:
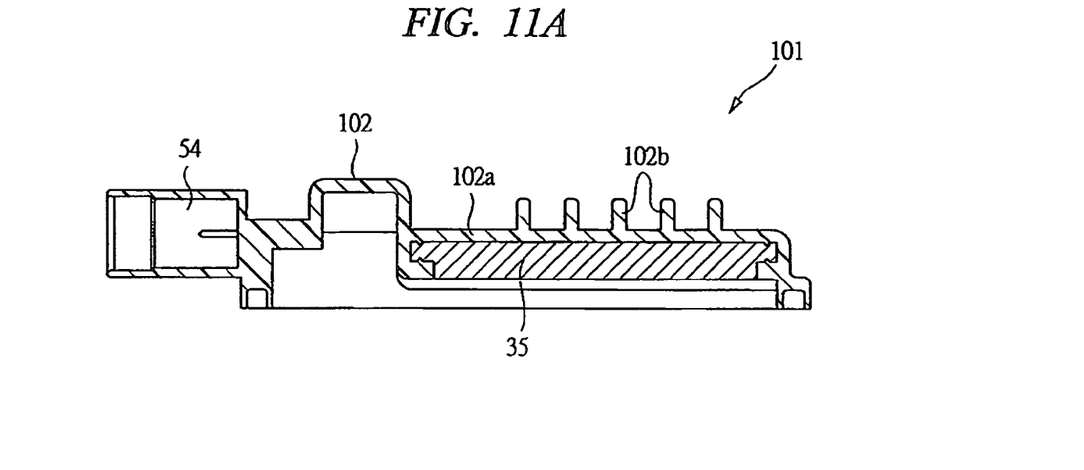
FIGS. 11A to 11C are each a cross-sectional view showing a modified example of the motor cover shown in FIG. 10.
Figure 11B:
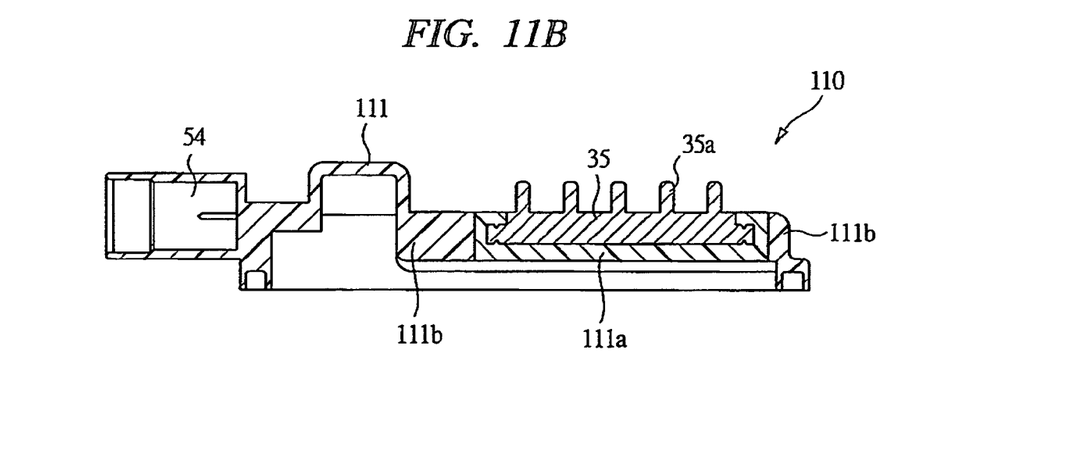
Figure 11C:
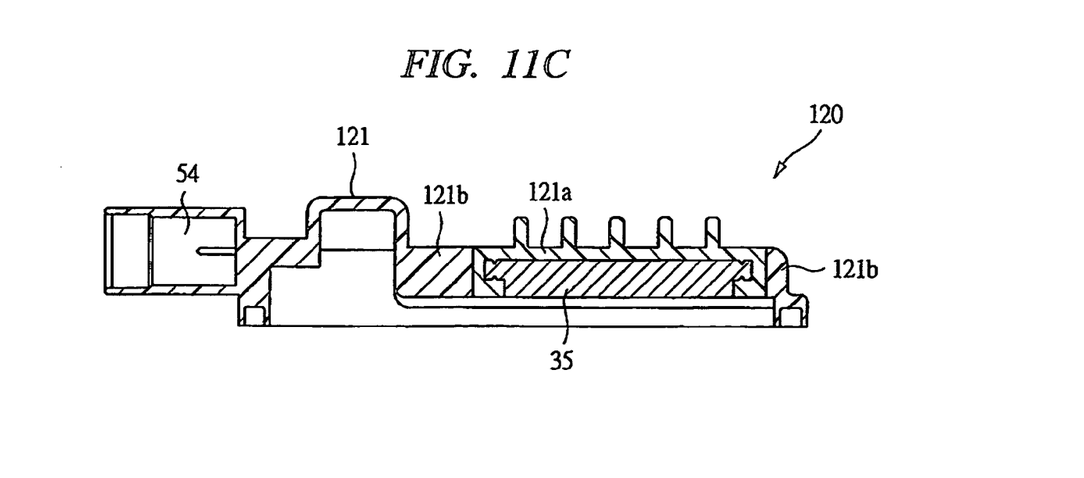

FIG. 11A to FIG. 11C are each a cross-sectional view showing a modified example of the motor cover shown in FIG. 10.

First, as shown in FIG. 11A, the heat sink 35 to be assembled in a motor cover 101 may be exposed only to a rear surface of the motor cover 101. In the case of forming the motor cover 101 in this manner, a heat radiating resin portion 102a for covering the front surface of the heat sink 35 is formed in the cover main body 102 of the motor cover 101, so that it is possible to form a resin layer expanding over the entire front surface of the motor cover 101 and increase the water-proof property of the motor cover 101. Furthermore, by forming the cover main body 102 of a thermal conductive resin material and forming a plurality of heat radiating fins 102b on the heat radiating resin portion 102a of the cover main body 102, it is possible to efficiently emit heat from the control board 51 to the outside.

Further, as shown in FIG. 11B and FIG. 11C, in the motor cover 110, the heat sink 35 is exposed to the front surface; and in the motor cover 120, the heat sink 35 is exposed to the rear surface. Under such arrangement, different resin materials may be employed to respective portions of the motor covers 110 and 120. Namely, the cover main bodies 111 and 121 of the motor covers 110 and 120 shown in Figure have: heat radiating resin portions 111a and 121a that contact with the heat sink 35; and base portions 111b and 121b that support the heat radiating resin portions 111a and 121a. In addition, the heat radiating resin portions 111a and 121a are made of thermal conductive resin materials while the base portions 111b and 121b may be made of resin materials different from the thermal conductive resin materials, for example, PBT (polybutylene terephthalate) resins. In this case, their formation is made by two-color formation in which two kinds of resin materials are cast under the condition that the heat sink 35 is disposed in a mold die of the motor covers 110 and 120. However, since molding materials of the heat radiating resin portions 111a and 121a and the base portions 111b and 121b are both resin materials, it is possible to preferably joint interfaces between the heat radiating resin portions 111a and 121a and the base portions 111b and 121b. For this reason, since a resin layer expanding entirely on the rear surface of the motor cover 110 and/or on the front surface of the motor cover 120 is formed, it is possible to make the motor covers 110 and 120 have high water-proof performance.

In this manner, since kinds of resin materials are changed according to the respective portions of the motor covers 110 and 120, it is possible to use low-cost resin materials for the base portions 111b and 121b of the motor covers 110 and 120 and to make this electric motor 17 with a deceleration mechanism further produced in low costs. Note that a molding method for molding the cover main bodies 111 and 121 is not limited to the two-color formation and may be also the insert molding and the like. Further, the resin materials of the cover main bodies 111 and 121 are not limited to two kinds of resin materials and may be further more resin materials. Further, the resin materials of the base portions 111b and 121b are not limited to PBT resins and, needless to say, may be other resin materials.

Note that in FIG. 10 and FIG. 11, members corresponding to the above-mentioned members are denoted by the same reference numerals.

Needless to say, the present invention is not limited to the above-mentioned embodiments and may be variously modified within a scope of not departing from the gist thereof. For example, in the above embodiments, the present invention has been applied to the motor covers 32, 91, 101, 110, and 120, which cover the case body 24 for containing the deceleration mechanism 25. However, the present invention is not limited to this, and may be applied to such any embodiment that a case body to be provided to an electric motor is covered, for example, may be applied to a front bracket that covers an opening portion of the yoke 21a of the motor main body 21 and has a heat sink and terminals.

Further, in the above-mentioned embodiments, the electric motor 17 with a deceleration mechanism is used as the drive source of the wiper apparatus 13. However, the present invention is not limited to this and may be applied to an electric motor used for other applications such as a power window apparatus and a door opening and closing apparatus.

Furthermore, in the above-mentioned embodiments, the first metal part is the heat sink 35 and the second metal parts are the power-feeding terminals 58 and 59. However, the present invention is not limited to this, and other metal parts may be used so long as they are metal parts fixed to the motor cover 32 by insert molding.

Moreover, in the above-mentioned embodiments, the branch portions 62 to 66 are branched in the direction orthogonal to the flow-in portion 61, but such a branch direction is not limited to this.

Still further, in the above-mentioned embodiments, the heat sink 35 is made of an aluminum material. However, the present invention is not limited to this, and other metal materials having thermal conductive properties may be used.

Furthermore, in the above-mentioned embodiments, a power-feeding unit is the control board 51 that controls the operation of the motor main body 21. However, it is not limited to this, and may be a brush apparatus that feeds electric power to the motor main body 21.

INDUSTRIAL APPLICABILITY

The present invention can be applied in manufacturing a motor cover for covering a case body provided in an electric motor.

The invention claimed is:

1. An electric motor equipped with a case body and a motor cover covering the case body, the electric motor comprising:
   a resin-made cover main body to be fixed by insert molding in a state where first and second metal parts are spaced from each other, the cover main body being provided in the motor cover; and
   a flow-in portion in which a resin material is cast when the cover main body is insert-molded, and a branch portion, which is formed to be branched to the flow-in portion and in which the resin material is cast via the flow-in portion, the flow-in portion and the branch portion being provided in the first metal part,
   wherein a portion of the second metal part is disposed in the branch portion.

2. The electric motor according to claim 1, wherein a cross-sectional area perpendicular to a longitudinal-directional axis line of the branch portion is formed smaller than a cross-sectional area perpendicular to a longitudinal-directional axis line of the flow-in portion.

3. The electric motor according to claim 1, wherein the first metal part is a heat sink, which is arranged so as to oppose a control circuit controlling the motor main body and emits heat inside the case body to outside, and the second metal part is a power-feeding terminal electrically connecting the control circuit and the motor main body.

4. The electric motor according to claim 3, wherein the flow-in portion and the branch portion are formed in a groove shape in the heat sink.

5. The electric motor according to claim 1, wherein the first metal part is exposed from only one surface of a front surface and a rear surface of the cover main body.

6. The electric motor according to claim 5, wherein a heat radiating resin portion contacting with the first metal part and a base portion supporting the heat radiating resin portion are provided in the cover main body; the heat radiating resin portion is formed of a thermal conductive resin material; and the base portion is formed of a resin material different from the thermal conductive resin material.

7. The electric motor according to claim 1, wherein the first metal part is formed of an aluminum material.

8. The electric motor according to claim 1, wherein the case body is formed of a conductor; and a power-feeding unit that controls power feeding to the electric motor and is electrically connected to the first metal part is contained in the case body; by a fixing member formed of a conductor, the cover main body is fixed to the case body and the first metal part is electrically connected to the case body.

9. The electric motor according to claim 8, wherein the power-feeding unit comprises a brush apparatus performing the power feeding to the electric motor.

10. The electric motor according to claim 8, wherein the power-feeding unit comprises a control circuit controlling the electric motor.

11. The electric motor according to claim 8, wherein the fixing member includes: a clip portion engaged with the case body and the cover main body and fixing the cover main body to the case body; and a contact portion formed so as to protrude from the clip portion and contacting with the first metal part.

12. The electric motor according to claim 8, wherein a contact portion is fixed by being press-fitted to a press-fitting portion provided in the first metal part.

* * * * *